Jan. 31, 1928.  
G. A. BERG  
1,657,783  
METHOD AND MEANS FOR EMPTYING MILK BOTTLES  
Filed June 10, 1926    3 Sheets-Sheet 1
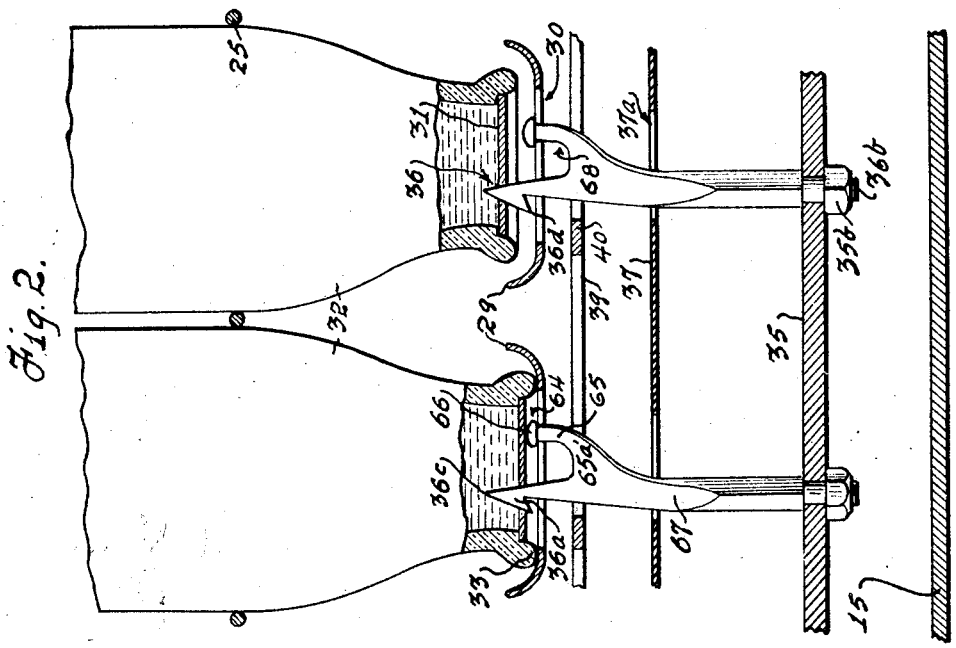
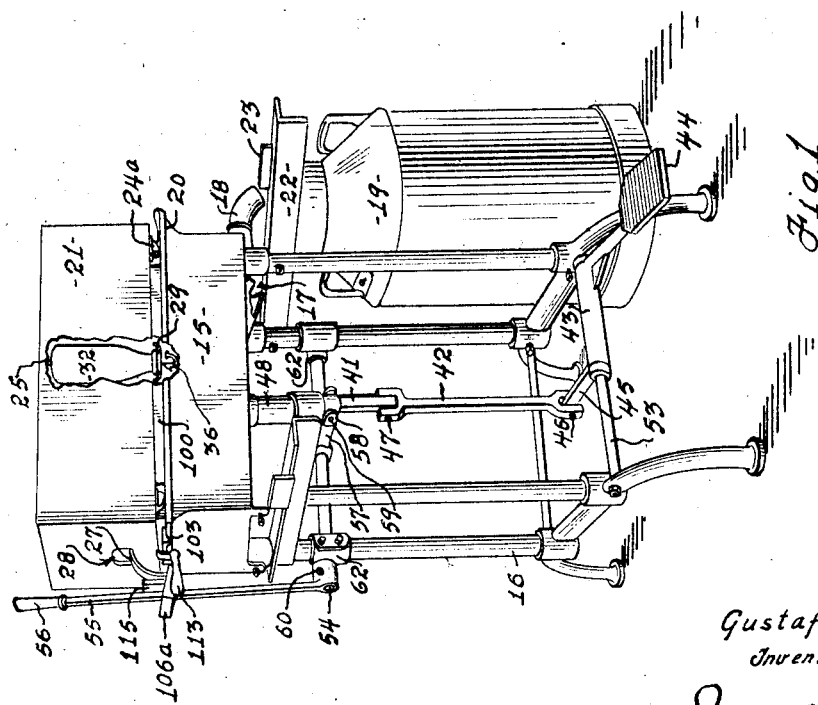
Gustaf A. Berg,
Inventor,
Attorney.

Jan. 31, 1928.　　　　　　　　　　　　　　　　1,657,783
G. A. BERG
METHOD AND MEANS FOR EMPTYING MILK BOTTLES
Filed June 10, 1926　　　　3 Sheets-Sheet 2
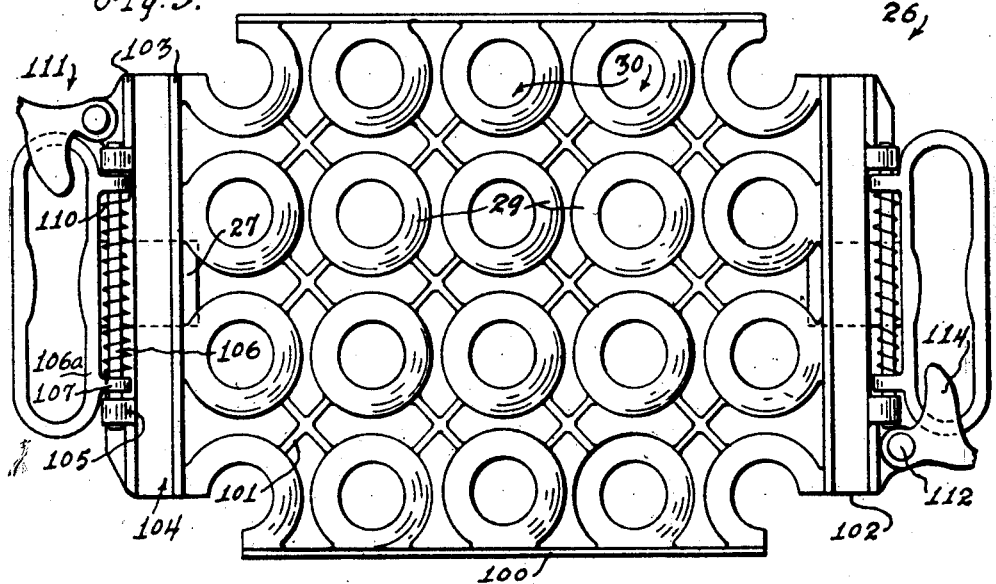
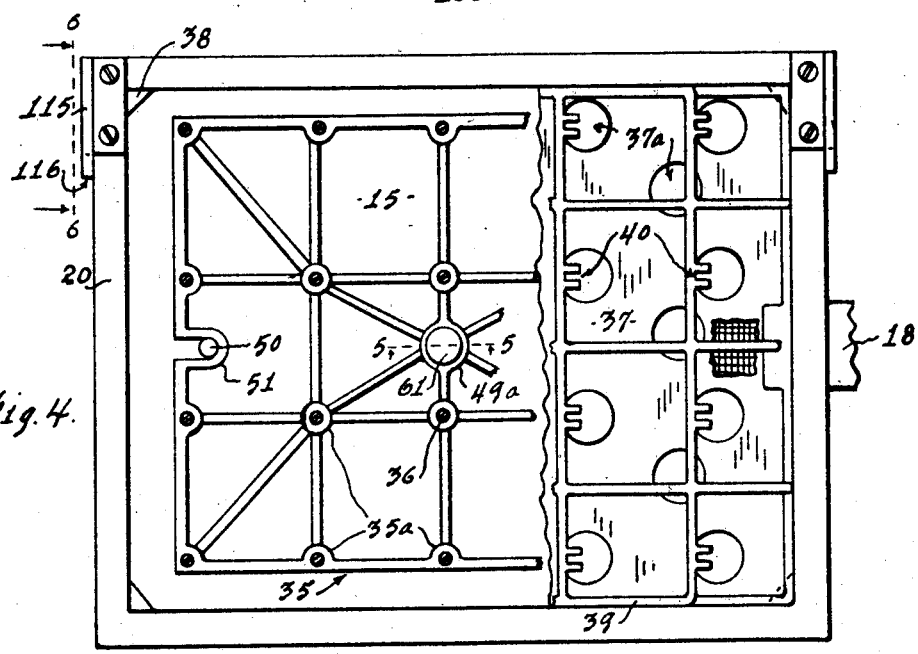
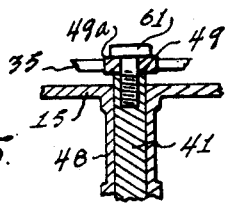
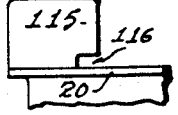
Gustaf A. Berg
Inventor,
Attorney.

Jan. 31, 1928.  1,657,783
G. A. BERG
METHOD AND MEANS FOR EMPTYING MILK BOTTLES
Filed June 10, 1926   3 Sheets-Sheet 3
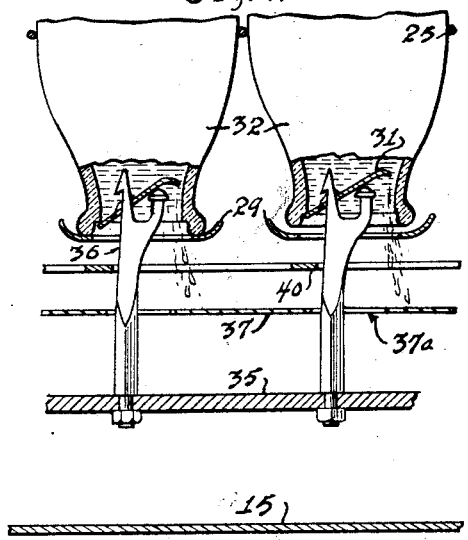
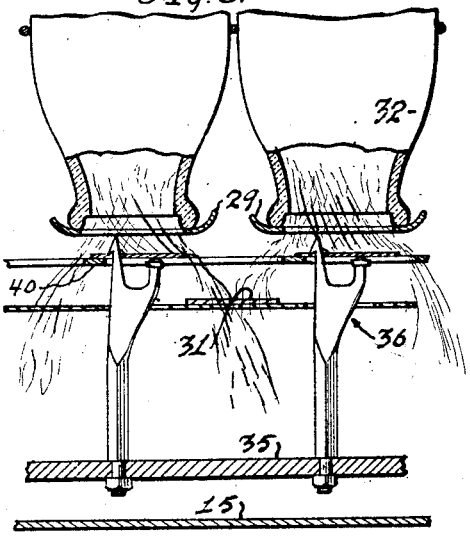
Gustaf A. Berg,
Inventor,
Attorney.

Patented Jan. 31, 1928.

1,657,783

UNITED STATES PATENT OFFICE.

GUSTAF A. BERG, OF LOS ANGELES, CALIFORNIA.

METHOD AND MEANS FOR EMPTYING MILK BOTTLES.

Application filed June 10, 1926. Serial No. 115,006.

The present invention relates to dairy equipment and pertains more particularly to methods and means for emptying filled milk bottles.

The invention has for its principal object the provision of a machine which is capable of emptying either a single milk bottle or an entire case of milk bottles at one time, without wasting any of the milk and without wasting the butter fat which adheres to the bottle stoppers.

When milk is returned unsold by drivers of milk wagons, it is customary to empty the filled bottles and save the milk and cream for various purposes, such as making butter. When a milk bottle stopper is removed by usual crude methods, some of the milk, and all of the cream adhering to the stoppers is wasted, and the present methods are slow and unsanitary.

Another object of the invention is to provide for quickly emptying an entire case, or part of a case of bottles, without waste of the milk or butter fat, in a very short period of time.

Another object of the invention is to provide a bottle emptying machine, and a method for emptying bottles, whereby the stoppers are automatically cleansed of any adhering butter fat, and whereby the milk and cream may be saved and directed into cans or the like without coming in contact with unsanitary surfaces or objects.

Other objects and advantages of the invention include the provision of means for expediently introducing a case of bottles to the machine, as well as means which render the machine particularly efficient, easily operated and cleaned, and adaptable to various sizes of bottles, cases and the like.

My invention contemplates inverting several bottles collectively over suitable stopper pulling means, preferably while said bottles are in a case, and causing each and every one of the bottle stoppers to be positively withdrawn under the washing action of the outpouring contents of the corresponding bottle, and to be subsequently subject to the washing action of successive bottles.

I have found that the bottles contained in one box or case may vary in length and the stoppers are variously disposed and show tendency to resist withdrawal to varying degrees. It is therefore another object of my invention to provide a bottle emptying machine having a plurality of individual stopper pulling means, one for each bottle, in which machine all such means are each capable of positively engaging and withdrawing a stopper regardless of the various tendencies on the part of the stoppers to resist withdrawal.

Upon first attempting to withdraw the stoppers from several bottles collectively, I employed a machine in which a plurality of barbed spears, one for each bottle, were moved toward the bottles until the spears each penetrated and engaged corresponding stoppers. In this machine an occasional stopper would not be penetrated at all. Other stoppers which were penetrated would remain in such position that even the barb of the spear would fail to engage the stopper when the spear was retracted. Those stoppers which were withdrawn by the spears would be at varying angles of inclination when removed, and would not be properly disposed under the washing action of the outpouring fluid.

I found it necessary to considerably improve upon such first machine in order to make it operable under practical conditions, and in the ensuing description, the reasons for, and the advantages of, such improvements will be manifest, as will numerous other objects and advantages of the present invention.

I have illustrated by the accompanying drawings one practical embodiment of my invention, for emptying cases of the bottles, as well as two simple forms of manual machines for emptying single bottles, and certain of the figures of the drawings graphically illustrate various steps in my improved method.

In said drawings:—

Figure 1 is a perspective view of an embodiment of my invention, which embodiment is particularly adapted for use in emptying an entire case of bottles at one time.

Figure 2 is a view in vertical section of a part of the machine, showing a plurality of the stopper pulling means in one characteristic position.

Figure 3 is a view in bottom elevation of a part hereinafter known as the bottle spacer.

Figure 4 is a plan of the part of the machine hereinafter known as the basin, with other parts connected therein; some of the parts being shown broken away to reveal underlying parts.

Figure 5 is a view in section on a line 5—5 of Fig. 4.

Figure 6 is a view in section on a line 6—6 of Fig. 4.

Figure 7 is a view analogous to Fig. 2, showing the said parts in another position.

Figure 8 is a view analogous to Fig. 2, showing the parts in still another position.

The machine illustrated in Figs. 1 to 8, inclusive, is provided with an open receptacle or basin 15, which is supported at a suitable elevation by legs 16. The basin is provided with a drain or outlet opening 17, from which leads a spout 18, whereby fluid may drain from the basin into a milk can 19 or the like.

The basin is provided with an upper encompassing flange 20, on which a bottle case, such as 21, may be slidably disposed. Forwardly of, and below the basin 15, there are provided spaced slides 22, provided with guides 23. The slides provide for placing the case 24 thereon in normal position, from which position the case may be lifted and inverted over the basin. Such cases are usually provided with upstanding studs 24ª, which provide for stacking one case upon another. Said cases are provided at the bottom with wires 25 or similar means for retaining the bottles.

In conjunction with the basin there is provided a removable bottle spacer 26, capable of being attached to the top of a case by means of curved arms 27, which extend into the hand holes 28; said hand holes being peculiar to all bottle cases. The bottle spacer includes a plurality of cupped bottle retainers 29, each provided with a central aperture 30, larger than the stoppers 31 of the bottles 32. When said bottle spacer is attached to a case, the said case may be inverted and the bottle will be retained; the enlarged upper edge 33 of each bottle becoming properly centered in the corresponding cupped retainer 29. The bottle retainers correspond in number and spacing to the bottles of a given case. Usually, quart bottles are carried in cases which hold twelve bottles, while pints and smaller bottles are carried in cases which hold twenty bottles. A complete machine may include different sizes of bottle spacers, according to the character of different cases which are apt to be encountered.

Within the basin there is provided a vertically movable deck 35, which carries a plurality of upstanding spears 36; the spears conforming in number and spacing to the upper bottle retainers, and the spear deck is interchangeable with other spear decks to suit other bottle spacers.

Suitably spaced above the spear deck, even when the spear deck is in uppermost position, there is provided a removable retainer or perforated metal sheet 37, provided with several apertures. The apertures are smaller than the bottle stoppers and certain of the said apertures conform in number and spacing to the spears of the spear deck used in conjunction with the strainer. The strainer rests on suitable lugs 38, or the like, provided within the basin. Above the strainer there is provided a removable stripper deck 39, having forked strippers 40 conforming in number and spacing to the spears. Each stripper is so disposed that its fork is in vertical alignment with a corresponding spear. When the spear deck is in lowermost position, the heads 36ª are below the strippers, and when the spears are moved toward uppermost position, the spears each pass through the corresponding forked stripper. The spear deck is provided with bosses 35ª, one for each spear. Each spear has a lower threaded end 36ᵇ which extends down through the corresponding boss and each spear is held in its boss by a nut 35ᵇ threaded on end 36ᵇ. The spear deck is of skeleton construction. The stripper deck is likewise of skeleton construction.

Means are provided for forcing the spear deck vertically upward in the bowl and other means are provided for positively retracting the spear deck from an upper position back to lowermost position. The first mentioned means comprises essentially a push rod 41, a pitman 42, and a rock sleeve 43 which is integrally provided with a foot pedal 44, and a rocker arm 45. The pitman is pivotally connected with the rocker arm, as at 46, and said pitman is again pivoted to the push rod, as at 47. By depressing the pedal, the push rod is raised. Said push rod extends through a sleeve 48 carried by the basin. Interiorly of the basin said rod is provided with a shoulder 49 on which an integral ring of the spear deck rests. At one end of the basin there is provided a stud 50 rising internally of the basin. The spear deck is provided with an integral yoke 51, which fits loosely over the stud whereby the spear deck is guided in vertical movement so that it cannot revolve relative to the basin or relative to the push rod. The rock sleeve 43 is fitted loosely on a transverse tie rod 53 carried by the forward legs of the machine.

The means for positively retracting the spear deck consists of a rock shaft 54, an upright lever 55 having a handle 56, and an arm 57 having a forked end 58. The forked end 58 of the arm 57 is fitted over the push rod just below the sleeve 48 so that said sleeve 48 serves as an upper limit for the movement of the arm 57. Said forked end of said arm is pivoted to the push rod, as at 59, and said arm is substantially an integral part of the rock shaft 54. The lever 55 is keyed to the rock shaft, as at 60, so that by pulling forward on the handle 56 the forked end of the arm 57 is caused to descend to positively pull the spear deck down to lowermost position. The push rod is provided with a removable screw 61 which prevents the push rod from descending without the spear deck; said pin being readily removable for replacement of the spear deck. The rock shaft 54 is trunnioned in bearings 62, 62, carried by the rear legs of the machine.

One of the salient features of my invention resides in the construction of the spears 26, and their disposition each with regard to the corresponding bottle retainer. When the bottle spacer is properly fitted on the case and the case is inverted over the basin, the flange 20, the spaced flanges 103 and grooves 104, provide for holding the bottle retainers in proper alignment with the spears. Accordingly, each spear point $36^c$ is disposed to one side of the exact center of the corresponding bottle stopper. Each spear carries a blunt instrument, generally indicated by the numeral 64. Said instrument, in the present embodiment, consists of a vertical shank 65, terminating in a blunt head 66; the shank rising parallel to the spear shaft 67 with the head terminating at a point appreciably below the horizontal plane of the lowermost point $36^d$ of the spear barb. The shank is connected with the spear by a transverse web $65^a$. The shank 65 is well spaced from the spear shaft to provide an intermediate space 68, and such space is of such width laterally as to dispose of the head 66 on the other side of the exact center of the bottle stopper with which the spear is aligned.

Before describing other structural details of the machine and before describing the operation of the machine as a whole, I will now describe the operation of the spear so that the manner in which it engages and retracts a stopper may be first understood.

In Fig. 2, one spear is shown as having been moved upwardly so that the barb has penetrated the stopper of a bottle which is held inverted over the spear. Obviously, if the spear were retracted from the position in which it is shown, the barb might easily pass back through the incision which it has made without retracting the stopper, and in fact I have found such to be the case to such an extent that it is commercially impractical to retract the spear at such time. Instead, the spear is caused to travel farther into the position in which it is shown in Fig. 7. In Fig. 2, the bottle to the right of the figure is assumed to be shorter than the other bottle, or else due to irregularities in the case that said bottle is free to move vertically a slight distance with the result that one barb has passed through a corresponding stopper while the barb of the other spear has not passed through the corresponding stopper. To provide against such contingency the spears are moved farther to the elevation in which they are shown in Fig. 7. By this time both spears have penetrated the stoppers; one spear being more advanced within the neck of the bottle than is the other spear in the corresponding bottle, but in both cases the spear barb has passed through the corresponding stopper. By this time, however, the blunt heads 66 have abutted the stoppers. Considering either spear singly: As the blunt head moves upwardly the stopper is positively tilted until the frictional contact with a corresponding portion of the bottle has been broken, and the stopper is accordingly loosened so that it may be retracted without offering resistance. When the blunt head ascends and inclines the stopper, said stopper moves laterally until the barb is advanced over a non-punctured part of the stopper. Obviously, the barb is now in a position to withdraw the stopper downwardly quite positively.

The operation of forcing the spears into the stoppers is done very rapidly, and all stoppers will be in the inclined position shown in Fig. 7 before any appreciable milk shall have escaped from any bottle. When the stoppers are all in substantially the position shown in said Figure 7, milk begins to flow from the bottles and the milk washes directly over the stoppers, tending to wash the cream therefrom.

However, before any appreciable quantity of milk has escaped, the foot pedal is released and the spear deck drops until all stoppers are in the position shown in Fig. 8. In such position the stoppers are each in abutment with the corresponding stripper and each stopper therefor assumes a horizontal position with each spear barb extending over a non-punctured portion of the corresponding stopper. Thus the weight of the spear deck and attached parts is prevented from causing further descent of the spear deck. While the stoppers are in this position, milk flows from each bottle downwardly over the underlying stopper. The stopper is comparatively close to the bottle and the fluid escapes by washing over the stopper, while same is in horizontal position, with considerable velocity and with a thorough washing action which tends to remove the cream from the stoppers.

At any suitable time, preferably after the bottles are drained, the handle is pulled forwardly so that the spear deck is forced downwardly. Thus the stoppers are stripped from the spears, and each stopper is free to fall upon the underlying strainer. Owing to the position of the stripper, fork and spear barb, relative to the corresponding stopper, each stopper will tend to turn over as it is stripped and fall with the inner side disposed uppermost. In this position removed stoppers are subsequently subjected to the washing action of the subsequently unstoppered bottles.

In the bottle spacer shown in bottom elevation in Fig. 3, certain of the cupped members 29 are attached to flanges, such as 100, while others are attached to the adjacent members by cross ties 101. The flanges, as seen in Fig. 1, act to prevent milk from splashing out of the machine. The bottle spacer includes end members 102; each providing spaced flanges 103, which provide grooves 104. Integral with each end member there are provided bosses 105, through which passes a shaft 106. Each curved arm 27 is attached to a handle 106ª, and each handle has bosses 107. For each handle 106ª there is provided the shaft 106 and said shaft passes through corresponding bosses 105 and 107, so that each handle is pivoted to the corresponding end member of the bottle spacer. For each handle there is provided a spring 110 which urges the handle to move to retract the corresponding arm 27 out of the corresponding hand hole 28. The arms are ordinarily held, each in a position to engage the corresponding hand hole, by a latch 111. Each latch is pivoted to the end member, as at 112 and includes a handle 113 and an extension 114. By swinging the latches into the position in which they are shown in Fig. 3, the handles are held against movement with the arms 27 engaging the bottle case.

To apply a case of bottles to the machine, the case is rested upon the slides 22. The bottle spacer is applied in the inverted position in which it is shown in Fig. 1, to the bottle case; the handles being locked by the latches so that the bottle spacer is securely held to the bottle case. Obviously the bottle spacer is not removable from the case until the latches are swung into position where they will free the handles. With the bottle spacer so attached to the bottle case, said case may be readily inverted over the basin 15 with the end portions of flange 20 fitting into the grooves 104 of the bottle spacer. Thus the bottle spacer is held in correct relation to the spears. At each rear corner of the basin I provide a safety member 115 in the form of an upstanding ear having a notch 116 on the plane of the top of the basin. If the rear end of each end member 102 is caused to extend into the notch of the corresponding member 115, the bottle spacer will be held against being tilted upwardly. If the bottle spacer is accidentally laid down over the members 115 instead of being properly positioned, the said end members are of such height that the bottle case will be noticeably inclined and will serve to warn the operator that the same is not properly positioned.

I claim:

1. In a machine of the class described, the combination of a basin, a bottle holder fixed over said basin and provided with an aperture, a spear movable vertically upward in said basin through said aperture into said bottle holder; said spear provided with a pointed end disposed to one side of said aperture.

2. In a machine of the class described, the combination of a basin, a bottle holder fixed over said basin and provided with an aperture, a spear movable vertically upward in said basin through said aperture into said bottle holder; said spear provided with a pointed end disposed to one side of said aperature, and a blunt instrument rising vertically in fixed spaced relation to said spear; said instrument having a blunt head terminating on a plane below the pointed end of the spear and disposed to the other side of the center of said aperture.

3. In a machine of the class described, a basin, means for holding a case of stoppered bottles inverted over said basin, a plurality of spears, means for collectively moving said spears vertically a sufficient distance to cause them to penetrate the stoppers of corresponding bottles, strippers; one for each spear, and other means for moving said spears positively downward through said strippers.

4. In a machine of the class described, the combination of an upright barbed spear, a bottle holder above said spear and disposed slightly to one side of said spear, a stripper for said spear below said bottle holder; said spear movable relatively to said bottle holder and stripper to cause said spear to penetrate the stopper of a bottle held by said bottle holder and a base below said bottle holder.

5. A method for emtying milk from stoppered bottles, which method consists in inverting the bottles, removing the stoppers, and washing the stoppers with the milk as it flows from the unstoppered bottles.

6. A method for emptying a stoppered milk bottle, which method consists in removing the stopper, causing the milk to flow from the bottle, and holding the stopper coaxial to the bottle a slight distance from said bottle so that its inner surface is washed directly by milk flowing from the bottle.

7. A method for emptying milk from stoppered bottles, which method consists in inverting the bottles, removing the stoppers, washing the stoppers with the milk as it flows from the unstoppered bottles, and subsequently removing the stoppers from such positions, and retaining said stoppers in such removed position as to be additionally washed by the contents of subsequently unstoppered bottles.

8. A method for emptying milk from stoppered bottles, which method consists in inverting the bottles, removing the stoppers, holding the removed stoppers slightly spaced from the corresponding bottles while the milk is flowing from the bottles, and subsequently removing the stoppers from such position, and retaining said stoppers in such position as to be additionally washed by the contents of subsequently unstoppered bottles.

9. A method for emptying a stoppered milk bottle, which method consists in removing the stopper, causing the milk to flow from the bottle, holding the stopper coaxial to the bottle a slight distance so that its inner surface is washed directly by milk flowing from the bottle, and subsequently removing the stopper from such position, and retaining said stopper in such removed position as to be additionally washed by the contents of subsequently unstoppered bottles.

10. In a device of the class described, a basin, a bottle holder for holding a stoppered bottle in inverted position over said basin, a spear provided with a barbed head; said spear movable relative to said bottle holder to penetrate the stopper of a bottle held inverted in said holder, a fixed stripper for said spear, and means operable during advance movement of said spear to incline a stopper which has been penetrated by said spear.

11. In a device of the class described, a basin, a bottle holder for holding a stoppered bottle in inverted position over said basin, a spear provided with a barbed head; said spear movable relative to said bottle holder to penetrate the stopper of a bottle held inverted in said holder, a fixed stripper for said spear, and means operable during advance movement of said spear to incline a stopper which has been penetrated by said spear; said spear coacting with said stripper to move the stopper to horizontal position before such stopper is stripped from said spear.

12. The method for emptying a bottle having a deformable disc stopper; which method consists in inverting the bottle, applying pressure upwardly to said stopper so as to cause it to buckle inwardly of the bottle, and subsequently moving the stopper substantially vertically downward.

GUSTAF A. BERG.